United States Patent
Kuehne

(10) Patent No.: US 11,645,820 B2
(45) Date of Patent: May 9, 2023

(54) METHOD AND CONTROL DEVICE FOR OPERATING A DISPLAY DEVICE WHICH CAN BE WORN ON THE HEAD IN A MOTOR VEHICLE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 304 days.

(21) Appl. No.: 17/273,969

(22) PCT Filed: May 21, 2019

(86) PCT No.: PCT/EP2019/063018
§ 371 (c)(1),
(2) Date: Mar. 5, 2021

(87) PCT Pub. No.: WO2020/048647
PCT Pub. Date: Mar. 12, 2020

(65) Prior Publication Data
US 2021/0335045 A1    Oct. 28, 2021

(30) Foreign Application Priority Data
Sep. 7, 2018  (DE) .................... 10 2018 215 265.9

(51) Int. Cl.
*G06T 19/00* (2011.01)
*G02B 27/01* (2006.01)
(Continued)

(52) U.S. Cl.
CPC ........ *G06T 19/006* (2013.01); *G02B 27/0101* (2013.01); *G06V 20/593* (2022.01);
(Continued)

(58) Field of Classification Search
CPC .............. G06T 19/006; G02B 27/0101; G02B 2027/0138; G02B 2027/014; G02B 27/01;
(Continued)

(56) References Cited

U.S. PATENT DOCUMENTS

| | | | |
|---|---|---|---|
| 2015/0309562 A1* | 10/2015 | Shams | G06F 3/013 345/8 |
| 2016/0212536 A1* | 7/2016 | Park | H04R 3/12 |
| 2018/0014182 A1 | 1/2018 | Jaegal et al. | |

FOREIGN PATENT DOCUMENTS

| | | | |
|---|---|---|---|
| DE | 10 2013 221 858 A1 | 4/2015 | |
| DE | 10 2014 206 623 A1 | 10/2015 | |

(Continued)

OTHER PUBLICATIONS

Notification of Transmittal of Translation of the International Preliminary Report on Patentability dated Mar. 11, 2021, in International Patent Application No. PCT/EP2019/063018 (7 pages).
(Continued)

*Primary Examiner* — Jeffery A Brier
(74) *Attorney, Agent, or Firm* — Staas & Halsey LLP

(57) ABSTRACT

Operation of a head-worn display device in a motor vehicle includes a control device checking a condition of whether there is a vehicle occupant in the motor vehicle other than a driver, when the motor vehicle is not operated in an autonomous driving mode. If the condition is satisfied then a display of all content by the head-worn display device is stopped by the control device if the display device is virtual reality glasses and the display of exclusively traffic-relevant content by the display device is enabled by the control device if the display device is augmented reality glasses.

20 Claims, 2 Drawing Sheets

(51) Int. Cl.
    *G08G 1/09*     (2006.01)
    *B60N 2/00*     (2006.01)
    *B60R 22/48*     (2006.01)
    *G05D 1/00*     (2006.01)
    *G06V 20/59*     (2022.01)

(52) U.S. Cl.
    CPC ............... *G08G 1/09* (2013.01); *B60N 2/002* (2013.01); *B60R 22/48* (2013.01); *B60R 2022/4816* (2013.01); *G02B 2027/014* (2013.01); *G02B 2027/0138* (2013.01); *G05D 1/0061* (2013.01)

(58) Field of Classification Search
    CPC .......... G08G 1/09; B60N 2/002; B60R 22/48; B60R 2022/4816; G05D 1/0061; G06V 20/593; B60K 37/06
    See application file for complete search history.

(56) References Cited

FOREIGN PATENT DOCUMENTS

| DE | 10 2016 003 019 A1 | 9/2017 |
|----|--------------------|--------|
| DE | 10 2016 213 916 A1 | 2/2018 |

OTHER PUBLICATIONS

International Search Report (Forms PCT/ISA/210, PCT/ISA/220, and PCT/ISA/237), dated Aug. 16, 2019, in International Patent Application No. PCT/EP2019/063018 (15 pages including machine translation).

Notification of the International Preliminary Report on Patentability (Form PCT/IPEA/409, Form PCT/IPEA/416), dated Mar. 25, 2020, in International Patent Application No. PCT/EP2019/063018, including Transmittal Letter and Amended Claims (42 pages including machine translation).

International Patent Application No. PCT/EP2019/063018, May 21, 2019, Marcus Kuehne, Audi AG.

German Patent Application No. 10 2018 215 265.9, Sep. 7, 2018, Marcus Kuehne, Audi AG.

\* cited by examiner

METHOD AND CONTROL DEVICE FOR OPERATING A DISPLAY DEVICE WHICH CAN BE WORN ON THE HEAD IN A MOTOR VEHICLE

CROSS-REFERENCE TO RELATED APPLICATIONS

This application is a U.S. national stage of International Application No. PCT/EP2019/063018, filed on May 21, 2019. The International Application claims the priority benefit of German Application No. 10 2018 215 265.9 filed on Sep. 7, 2018. Both the International Application and the German Application are incorporated by reference herein in their entirety.

BACKGROUND

Described herein is a method and a control device for operating a headworn display device in a motor vehicle. Furthermore, also described herein is a motor vehicle having such a control device.

It will be possible in the foreseeable future to wear virtual reality glasses or augmented reality glasses in motor vehicles for entertainment purposes and to use them to enjoy various content. Such entertainment options are intended more for passengers but not so much for a driver himself during a journey—in particular before the availability of autonomous driving.

German Patent Application No. 10 2013 221 858 A1 describes a method for operating smartglasses in a motor vehicle. If it is determined that a seat associated with the smartglasses is the driver's seat of the vehicle then a transmission of useful data, in particular graphics or video data, to the smartglasses is stopped. This is done in particular if it is not possible to safely determine that the smartglasses are not being used by the driver in a mode of operation adapted for a driving task. This is intended to reduce the risk of distraction by the smartglasses.

German Patent Application No. 10 2014 206 623 A3 describes a method for operating smartglasses in a vehicle. A display on the smartglasses is controlled on the basis of a seat of a user of the smartglasses.

German Patent Application No. 10 2016 213 916 A1 describes an infotainment system of a motor vehicle that has smartglasses for presenting a virtual reality, the smartglasses being able to be associated with a quite specific seat.

SUMMARY

One or more aspects of the disclosure are to provide a solution by which it is possible to ensure particularly easily that a driver of a motor vehicle is not distracted from his driving task by a headworn display device.

This may be achieved by a method and by a control device for operating a headworn display device in a motor vehicle having features described herein. Advantageous configurations with expedient and nontrivial developments are further described herein.

The method described herein for operating a headworn display device in a motor vehicle involves checking at least the condition of whether there is no other vehicle occupant in the motor vehicle apart from a driver when the motor vehicle is not operated in an autonomous driving mode (i.e., checking or determining whether there is at least one other vehicle occupant in the motor vehicle). For the purposes of the disclosure, this is intended to be understood to mean that the driver is driving the motor vehicle entirely himself. It can also be understood to mean that specific assistance systems assist in vehicle operation, for example adaptive cruise control. It can also be understood to mean that there is a certain amount of semi-automation for performing the driving task. Functions such as automatic parking, holding course, general steering guidance, accelerating and decelerating can likewise be undertaken by assistance systems, for example by a traffic jam assistant.

The motor vehicle not being operated in an autonomous driving mode can concern for example autonomy levels 0, 1 and 2 according to SAE standard J3016. An autonomous driving mode for the purposes of the disclosure is thus intended to be understood to mean that operation is automated, for example. The driver does not need to constantly monitor the system, for example the motor vehicle. The motor vehicle performs functions such as triggering the turn signal, changing lane and holding course autonomously. The driver can address other things but, if necessary, is asked by the system to take over guidance within an advance warning period. High-level automation for the purposes of the disclosure can also be covered by the motor vehicle being operated in an autonomous driving mode. Guidance of the motor vehicle is continually monitored by a suitable system. If the driving tasks are no longer managed by the system, the driver can be asked to take over guidance. An autonomous driving mode can also be understood to mean that there is full automation requiring no driver at all. Other than stipulating the destination and starting the system, no human action is required.

The motor vehicle can fundamentally be a motor vehicle that can itself drive autonomously or else cannot drive autonomously. If the motor vehicle is not operated in an autonomous driving mode—be it because the motor vehicle is not actually capable of this or because an appropriate driving mode is currently selected—and the condition that there is no other vehicle occupant in the motor vehicle apart from the driver is satisfied (i.e., the condition that at least one vehicle occupant other than the driver is in the motor vehicle is satisfied) then one of the following limitations on the headworn display device with regard to a display of content is imposed: the display of all content is stopped if the display device is virtual reality glasses, and the display of exclusively traffic-relevant content by use of the display device is enabled if the display device is augmented reality glasses.

In order to reduce the risk of the driver mistakenly or consciously using his virtual reality glasses or augmented reality glasses when driving on his own, and thus possibly exposing himself to avoidable risks, the display of all content is stopped if the display device is virtual reality glasses, the display of exclusively traffic-relevant content by use of the display device being enabled if the display device is augmented reality glasses. In the case of augmented reality glasses, these are thus controlled such that they can be used only in a mode of operation that is adapted for the driving task. In that case the augmented reality glasses can display for example navigation information, speed information and the like, the display of graphics and/or videos that merely serve entertainment purposes then being stopped in that case. In the case of virtual reality glasses it is appropriate to stop displaying all content if the aforementioned condition is satisfied. The reason is that virtual reality glasses visually isolate the wearer from his surroundings completely.

One or more aspects of the disclosure are based on the insight that if a passenger or front-seat passenger is detected, on the other hand, then it can be assumed that he or she uses the headworn display device himself or herself or would stop use by the driver. The method described herein does not require a complex sensor system to be used to determine precisely where in the motor vehicle the headworn display device is situated and by which vehicle occupant it is worn. The method described herein thus provides a particularly simple and nevertheless reliable way of preventing a driver from being distracted from his actual driving task by wearing the headworn display device if the motor vehicle is not operated in an autonomous driving mode.

In one advantageous embodiment, if there is another vehicle occupant in the motor vehicle then a further condition checked is whether this vehicle occupant is behind respective front seats of the motor vehicle, for example in a rear seat of the motor vehicle, and only if this further condition is satisfied is the display of any content whatever by use of the display device enabled (i.e., the content or type of content displayed by the display device is not restricted or limited), the limitation being imposed if the further condition is not satisfied. The limitation thus means that the display of all content is stopped in the case of the virtual reality glasses and is enabled exclusively for displaying traffic-relevant content in the case of the augmented reality glasses. If use of the headworn display device is thus desirable or admissible only in the rear seat, for example, then other vehicle occupants present besides the driver result in a check being performed to determine whether the other occupants are in the rear seat, for example. The limitation in reference to the reproduction or display of content by use of the display device is thus imposed if the at least one other vehicle occupant should be not in the rear seat and instead in the passenger seat, for example. If, on the other hand, it is determined that the at least one other vehicle occupant is sitting in the rear seat then the headworn display device can be used to display all content. This measure provides a particularly reliable way of ensuring that the driver cannot be distracted from his driving task by the headworn display device. The reason is that in this case it is quite simply also only possible to use or take advantage of the headworn display device to display any content whatever only if at least one other vehicle occupant has sat down behind the front seats of the motor vehicle, for example in a rear seat.

In a further advantageous embodiment described herein, the display of all content is stopped in the case of the virtual reality glasses by virtue of a data transmission of displayable content from the motor vehicle and/or from another data source to the virtual reality glasses being stopped. Image data and/or video data can be transmitted from an on-vehicle infotainment system to the virtual reality glasses, for example. If the display of all content on the virtual reality glasses is intended to be stopped then for example an appropriate data connection between the infotainment system and the virtual reality glasses can be interrupted for as long as the condition that there is no other vehicle occupant in the motor vehicle apart from the driver is satisfied. In the case of the augmented reality glasses it is possible for example for only the transmission of traffic-relevant content to the augmented reality glasses to be enabled on the glasses or else in the vehicle while the limitation is intended to be imposed. It is also possible for the headworn display device to receive the data to be displayed from a smartphone or another device not permanently installed in the vehicle, for example. In that case the data transmission of displayable content can likewise be stopped in the case of the virtual reality glasses or appropriately filtered in the case of the augmented reality glasses.

According to a further advantageous embodiment described herein, the display of all content is stopped in the case of the virtual reality glasses by virtue of the virtual reality glasses being deactivated. This provides a particularly reliable way of ensuring that no content at all can be displayed by use of the virtual reality glasses in the case of the aforementioned limitation. Should the driver have put on the virtual reality glasses while the motor vehicle is not operated in an autonomous driving mode, he would most likely take off or remove the virtual reality glasses since they are then deactivated, of course.

In a further advantageous configuration described herein, seat occupancy detection is used to check whether there is no other vehicle occupant in the motor vehicle apart from the driver. This can be accomplished by using appropriate seat occupancy sensors in the motor vehicle. The check to determine whether there may be another vehicle occupant behind respective front seats of the motor vehicle can likewise be checked by use of the seat occupancy detection too. The seat occupancy detection provides a simple way of checking whether and where there are vehicle occupants in the motor vehicle.

In a further advantageous embodiment described herein, an opening and closing of vehicle doors of the motor vehicle is monitored and this is taken as a basis for checking whether there is no other vehicle occupant in the motor vehicle apart from the driver. In this way it is also possible to check whether a further vehicle occupant has sat down in the rear seat or in a passenger seat, for example. The monitoring of opening and closing movements of the vehicle doors provides a simple way of checking where specific vehicle occupants are most likely to have sat down.

According to a further advantageous embodiment described herein, an opening and closing of seatbelt locks of the motor vehicle is monitored and this is taken as a basis for checking whether there is no other vehicle occupant in the motor vehicle apart from the driver. Quite generally, the checking or monitoring of the seatbelt locks of the motor vehicle allows fairly reliable determination of whether and where specific vehicle occupants have sat down in the motor vehicle.

In a further advantageous embodiment described herein, a camera-based system is used to check whether there is no other vehicle occupant in the motor vehicle apart from the driver. A camera-based system can also be used to check or monitor where vehicle occupants that may be present have sat down in the motor vehicle. Quite generally, sensors for vehicle occupancy and/or vehicle state detection that are installed in the motor vehicle, for example in the form of cameras, can be used to capture the driver himself or other vehicle occupants and their positioning in the motor vehicle.

The control device described herein for operating a headworn display device in a motor vehicle is designed to perform the method described herein or an advantageous embodiment of the method described herein. Advantageous configurations of the method described herein can be regarded as advantageous configurations of the control device described herein and vice versa, the control device having features for performing the method operations. The control device can have one or more data interfaces, for example, by use of which the control device can be connected to a wide variety of sensors or detection devices that can be used for checking the aforementioned conditions.

The motor vehicle described herein includes the control device described herein or an advantageous embodiment of the control device described herein. According to a further independent aspect described herein there can also be provision for the headworn display device itself to have the control device.

Further advantages, features and details of the disclosure will emerge from the description of example embodiments described herein and on the basis of the drawings. The features and combinations of features cited in the description above and the features and combinations of features cited in the description of the drawings below and/or shown in the drawings alone can be used not only in the respectively indicated combination but also in other combinations or on their own without departing from the scope of the disclosure.

BRIEF DESCRIPTION OF THE DRAWINGS

These and other aspects and advantages will become more apparent and more readily appreciated from the following description of example embodiments, taken in conjunction with the accompanying drawings, of which.

DETAILED DESCRIPTION

Figure 1:
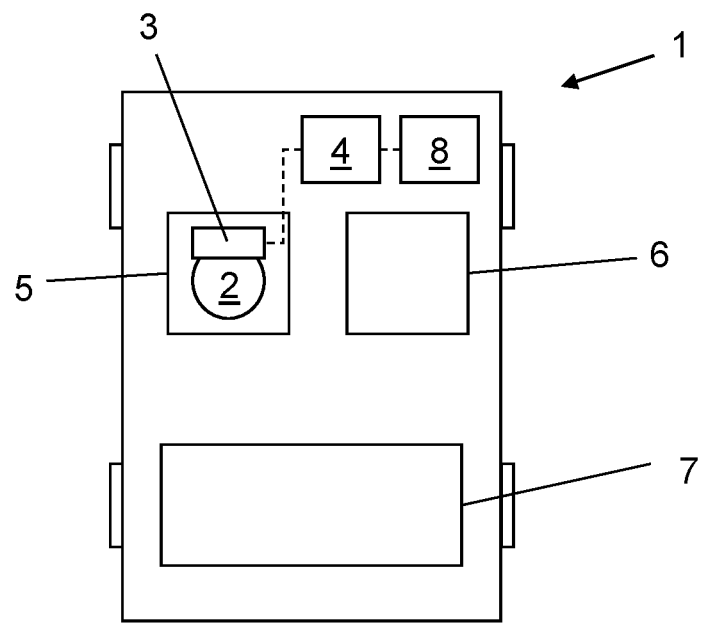
FIG. 1 is a schematic depiction of a motor vehicle in which a driver with virtual reality glasses on sits.

Reference will now be made in detail to examples which are illustrated in the accompanying drawings. In the drawings, identical or functionally identical elements have been provided with the same reference signs in the drawings.

A motor vehicle 1 is shown in a schematic depiction in FIG. 1. A driver 2 who has put on virtual reality glasses 3 sits in the motor vehicle 1. The virtual reality glasses 3 are connected for signal transmission purposes or data transmission purposes to a control device 4 that is designed to control the virtual reality glasses 3. The data connection is for example made wirelessly. The driver 2 sits in a driver's seat 5, with a passenger seat 6 and a rear seat 7 of the motor vehicle 1 unoccupied.

A method for operating the virtual reality glasses 3 in the motor vehicle 1 is described in more detail below. If the motor vehicle 1 is not operated in an autonomous driving mode then the control device 4 is used to check at least the condition of whether there is no other vehicle occupant in the motor vehicle 1 apart from the driver 2. To check this, a detection device 8 is installed or arranged in the motor vehicle 1.

The detection device 8 can perform for example seat occupancy detection by use of appropriate seat occupancy sensors in order to check whether there is no other vehicle occupant in the motor vehicle 1 apart from the driver 2. The detection device 8 can also have appropriate sensors that are designed to check or monitor an opening and closing of vehicle doors of the motor vehicle 1, as a result of which the control device 4 can take this as a basis for checking whether there is no other vehicle occupant in the motor vehicle 1 apart from the driver 2.

The detection device 8 can also have appropriate sensors that can monitor the monitoring of an opening and closing of seatbelt locks of the motor vehicle 1, the control device 4 being able to take this as a basis for checking whether there is no other vehicle occupant in the motor vehicle 1 apart from the driver 2. Moreover, the detection device 8 can also have one or more cameras, as a result of which the detection device 8 or control device 4 can use a camera-based system to check whether there is no other vehicle occupant in the motor vehicle 1 apart from the driver 2. Quite generally, the detection device 8 can supply the control device 4 with a wide variety of sensor data with regard to the vehicle occupancy, as a result of which the control device 4 can take these sensor data as a basis for checking the condition of whether there is no other vehicle occupant in the motor vehicle apart from the driver 2.

If this condition is satisfied then the control device 4 imposes the following limitations on the virtual reality glasses 3: the display of all content by use of the virtual reality glasses 3 is stopped. So if the driver 2 sits alone in the motor vehicle 1, it is quite simply impossible for him to use the virtual reality glasses 3 to display any content while the motor vehicle 1 is not operated in an autonomous driving mode. Thus, the driver 2 will then inevitably take off the virtual reality glasses 3, as a result of which he can perform his actual driving task without any distraction.

It is also possible for augmented reality glasses to be involved rather than virtual reality glasses 3. In that case the display of exclusively traffic-relevant content by use of the display device is enabled. Thus, the augmented reality glasses can then be used to display only such content as assists the driver 2 in performing his driving task, for example by virtue of navigation information, speed information and the like being displayed, but no kind of entertaining content.

Figure 2:
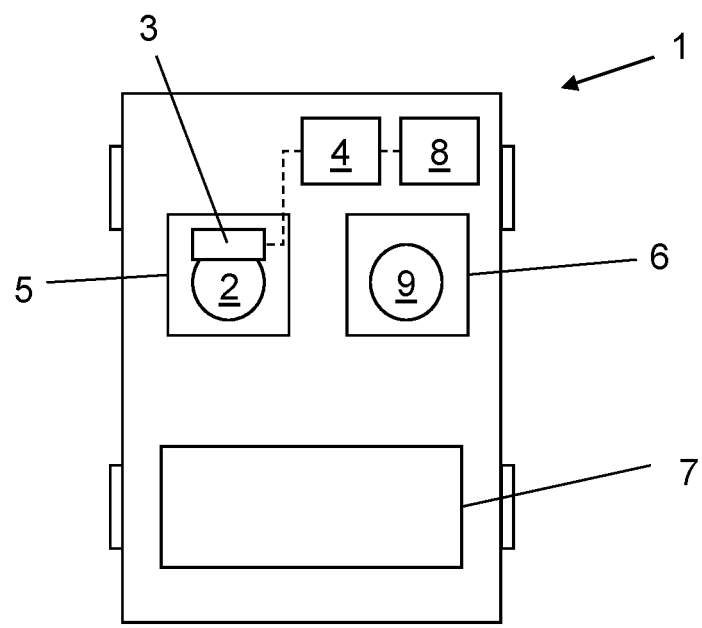
FIG. 2 is a further schematic depiction of the motor vehicle, another vehicle occupant besides the driver having sat down in a passenger seat.

FIG. 2 shows the motor vehicle 1 in a further schematic depiction, another vehicle occupant 9 having sat down in the passenger seat 6. In that case there can be provision for the aforementioned limitation not to be imposed on the virtual reality glasses 3—or on the augmented reality glasses. It can be assumed that the other vehicle occupant 9 will encourage the driver 2 to remove the virtual reality glasses 3. Alternatively, contrary to the present depiction, it may also be that the vehicle occupant 9 who has sat down in the passenger seat 6 has put on the virtual reality glasses 3, as a result of which there is no need at all to limit the mode of operation of the virtual reality glasses 3 in the aforementioned manner. The same then also applies to the augmented reality glasses that were already mentioned previously.

Another possibility, however, is that if the other vehicle occupant 9 is in the motor vehicle 1 then a further condition checked is whether this vehicle occupant 9 is behind the front seats 5, 6 of the motor vehicle 1, for example in the rear seat 7, and only if this further condition is satisfied is the display of any content whatever by use of the virtual reality glasses 3—or by use of the augmented reality glasses— enabled (permitted). Should this further condition not be satisfied then the aforementioned limitations are imposed. There can thus also be provision for the virtual reality glasses 3—or the augmented reality glasses—not to be used at all by vehicle occupants who have sat down in the front seats 5, 6. This provides a particularly reliable way of preventing the driver 2 from possibly being distracted from his driving task by wearing the virtual reality glasses 3 or by wearing the augmented reality glasses if the motor vehicle 1 is not operated in an autonomous driving mode.

Figure 3:
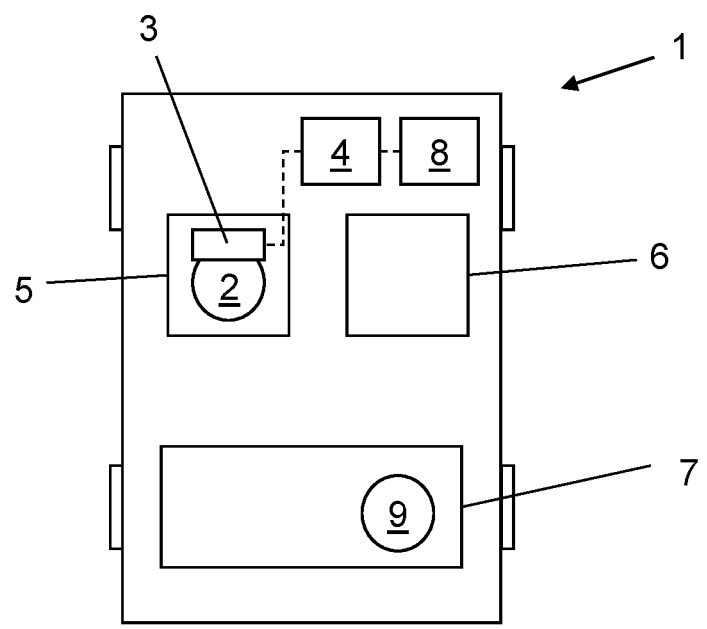
FIG. 3 is a further schematic depiction of the motor vehicle, the further vehicle occupant having sat down in a rear seat of the motor vehicle.

FIG. 3 shows the motor vehicle 1 in a further schematic depiction, the vehicle occupant 9 now having sat down in the rear seat 7. In this case no kind of limitation is thus imposed in reference to the mode of operation of the virtual reality glasses 3 or the augmented reality glasses. Contrary to the present depiction, it could also be that the virtual reality glasses 3 or augmented reality glasses have been put on by the vehicle occupant 9.

The display of all content can be stopped in the case of the virtual reality glasses 3 for example by virtue of the control device 4 stopping a data transmission of displayable content to the virtual reality glasses 3 from the motor vehicle 1 and/or from other data sources, for example from a smartphone, a tablet computer—via an Internet connection or the like. It is also possible for the display of all content to be stopped in the case of the virtual reality glasses 3 by virtue of the virtual reality glasses 3 being deactivated by the control device 4. In the case of the augmented reality glasses it is possible for example for a data transmission for the augmented reality glasses to be filtered such that only traffic-relevant content is transmitted to the augmented reality glasses. Alternatively, it is also possible simply for action to be taken in the control of the augmented reality glasses such that they can display only traffic-relevant content if this limitation is intended to apply. The control device 4 can be part of the motor vehicle 1. Alternatively, however, it is also possible for the control device 4 to be part of the virtual reality glasses 3 or the augmented reality glasses.

The outlined method and the outlined control device 4 thus provide a particularly simple and reliable way of preventing the driver 2 from being distracted from his actual driving task by wearing the virtual reality glasses 3 or by wearing the augmented reality glasses in a nonautonomous driving mode of the motor vehicle 1.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a head-worn display device in a motor vehicle, the method comprising:
   determining whether there is a vehicle occupant in the motor vehicle other than a driver of the motor vehicle, in response to the motor vehicle not being operated in an autonomous driving mode;
   when there is not a vehicle occupant in the motor vehicle other than the driver of the motor vehicle based on the determining, stopping a display of all content by the display device, when the display device is virtual reality glasses, and limiting the display of content by the display device to exclusively traffic-relevant content when the display device is augmented reality glasses;
   when there is a vehicle occupant in the motor vehicle other than the driver of the motor vehicle based on the determining, determining whether the vehicle occupant is located behind a front seat of the motor;
   when the vehicle occupant is located behind the front seat of the motor vehicle, permitting any content to be displayed by the display device; and
   when the vehicle occupant is not located behind the front seat of the motor vehicle, stopping the display of all content by the display device when the display device is virtual reality glasses, and limiting the display of content by the display device to exclusively traffic-relevant content when the display device is augmented reality glasses.

2. The method according to claim 1, wherein determining whether the vehicle occupant is located behind the front seat of the motor vehicle includes determining whether the vehicle occupant is in a rear seat of the motor vehicle.

3. The method according to claim 1, wherein stopping the display of all content includes stopping a data transmission of displayable content from the motor vehicle and/or from another data source to the virtual reality glasses.

4. The method according to claim 1, wherein stopping the display of all content includes deactivating the virtual reality glasses.

5. The method according to claim 1, wherein determining whether there is the vehicle occupant in the motor vehicle other than the driver of the motor vehicle includes detecting seat occupancy.

6. The method according to claim 1, wherein determining whether there is the vehicle occupant in the motor vehicle other than the driver of the motor vehicle includes monitoring an opening and closing of vehicle doors of the motor vehicle.

7. The method according to claim 1, wherein determining whether there is the vehicle occupant in the motor vehicle other than the driver of the motor vehicle includes monitoring an opening and closing of seatbelt locks of the motor vehicle.

8. The method according to claim 1, wherein determining whether there is the vehicle occupant in the motor vehicle other than the driver of the motor vehicle includes analyzing an interior of the motor vehicle using a camera-based system.

9. The method according to claim 1, further comprising receiving data from a detector having at least one sensor, the data including information regarding vehicle occupancy, and
   determining whether there is the vehicle occupant in the motor vehicle other than the driver of the motor vehicle is based on the data received from the detector.

10. A control device for operating a head-worn display device in a motor vehicle, the control device comprising:
    a memory configured to store instructions; and
    a processor configured to execute the instructions stored in the memory to:
      determine whether there is a vehicle occupant in the motor vehicle other than a driver of the motor vehicle, in response to the motor vehicle not being operated in an autonomous driving mode,
      when it is determined there is not a vehicle occupant in the motor vehicle other than the driver of the motor vehicle, stop a display of all content by the display device, when the display device is virtual reality glasses, and limit the display of content by the display device to exclusively traffic-relevant content when the display device is augmented reality glasses,
      when it is determined there is a vehicle occupant in the motor vehicle other than the driver of the motor vehicle, determine whether the vehicle occupant is located behind a front seat of the motor,
      when it is determined the vehicle occupant is located behind the front seat of the motor vehicle, permit any content to be displayed by the display device, and
      when it is determined the vehicle occupant is not located behind the front seat of the motor vehicle, stop the display of all content by the display device when the display device is virtual reality glasses, and limit the display of content by the display device to exclusively traffic-relevant content when the display device is augmented reality glasses.

11. The control device according to claim 10, wherein the processor is configured to determine whether the vehicle occupant is located behind the front seat of the motor vehicle by determining whether the vehicle occupant is in a rear seat of the motor vehicle.

12. The control device according to claim 10, wherein the processor is configured to stop the display of all content by deactivating the virtual reality glasses or by stopping a data transmission of displayable content from the motor vehicle and/or from another data source to the virtual reality glasses.

13. The control device according to claim 10, wherein the processor is configured to determine whether there is the vehicle occupant in the motor vehicle other than the driver of the motor vehicle based on at least one of a detected seat occupancy, an opening and closing of vehicle doors of the motor vehicle, an opening and closing of seatbelt locks of the motor vehicle, or an image of an interior of the motor vehicle captured by a camera-based system.

14. The control device according to claim 10, wherein
the processor is configured to receive data from a detector having at least one sensor, the data including information regarding vehicle occupancy, and
the processor is configured to determine whether there is the vehicle occupant in the motor vehicle other than the driver of the motor vehicle based on the data received from the detector.

15. The control device according to claim 10, wherein the control device is installed in the display device or in the motor vehicle.

16. A motor vehicle, comprising:
a front seat to accommodate a driver; and
a control device configured to operate a head-worn display device, the control device including:
a memory configured to store instructions; and
a processor configured to execute the instructions stored in the memory to:
determine whether there is a vehicle occupant in the motor vehicle other than the driver of the motor vehicle, in response to the motor vehicle not being operated in an autonomous driving mode,
when it is determined there is not a vehicle occupant in the motor vehicle other than the driver of the motor vehicle, stop a display of all content by the display device, when the display device is virtual reality glasses, and limit the display of content by the display device to exclusively traffic-relevant content when the display device is augmented reality glasses,
when it is determined there is a vehicle occupant in the motor vehicle other than the driver of the motor vehicle, determine whether the vehicle occupant is located behind a front seat of the motor,
when it is determined the vehicle occupant is located behind the front seat of the motor vehicle, permit any content to be displayed by the display device, and
when it is determined the vehicle occupant is not located behind the front seat of the motor vehicle, stop the display of all content by the display device when the display device is virtual reality glasses, and limit the display of content by the display device to exclusively traffic-relevant content when the display device is augmented reality glasses.

17. The motor vehicle according to claim 16, further comprising a rear seat,
wherein the processor is configured to determine whether the vehicle occupant is located behind the front seat of the motor vehicle by determining whether the vehicle occupant is in the rear seat.

18. The motor vehicle according to claim 16, wherein the processor is configured to stop the display of all content by deactivating the virtual reality glasses or by stopping a data transmission of displayable content from the motor vehicle and/or from another data source to the virtual reality glasses.

19. The motor vehicle according to claim 16, further comprising a detector including at least one sensor configured to obtain information regarding whether there is the vehicle occupant in the motor vehicle other than the driver of the motor vehicle, the detector being configured to sense at least one of a seat occupancy, an opening and closing of vehicle doors of the motor vehicle, an opening and closing of seatbelt locks of the motor vehicle, or a presence of vehicle occupants based on an image of an interior of the motor vehicle captured by a camera-based system.

20. The motor vehicle according to claim 16, further comprising:
a detector including at least one sensor to collect information regarding vehicle occupancy and to transmit the information to the control device,
wherein the processor is configured to receive the information from the detector and to determine whether there is the vehicle occupant in the motor vehicle other than the driver of the motor vehicle based on the information received from the detector.

* * * * *